United States Patent [19]

Holzmann et al.

[11] Patent Number: 5,039,175

[45] Date of Patent: Aug. 13, 1991

[54] HYDRAULIC BRAKE SYSTEM FOR VEHICLES

[75] Inventors: Roland Holzmann, Oettingen; Guenther Schmidt, Tamm-Hohenstange; Karl-Heinz Willmann, Freiberg/N, all of Fed. Rep. of Germany

[73] Assignee: Robert Bosch GmbH, Stuttgart, Fed. Rep. of Germany

[21] Appl. No.: 542,133

[22] Filed: Jun. 22, 1990

[30] Foreign Application Priority Data

Jul. 12, 1989 [DE] Fed. Rep. of Germany ....... 3922947

[51] Int. Cl.$^5$ .......................... B60T 8/32; B60T 8/60; B60T 13/12; B60T 13/68
[52] U.S. Cl. ..................................... 303/92; 303/116; 303/119; 303/DIG. 3; 303/DIG. 4
[58] Field of Search ................ 303/92, 100, 113, 114, 303/115, 116, 119, DIG. 3-4; 364/426.02

[56] References Cited

U.S. PATENT DOCUMENTS

| | | | |
|---|---|---|---|
| 3,948,568 | 4/1976 | Leiber | 303/92 |
| 4,484,784 | 11/1984 | Leiber | 303/119 X |
| 4,824,182 | 4/1989 | Steffes et al. | 303/DIG. 4 X |
| 4,869,558 | 9/1989 | Yoshino | 303/DIG. 3 X |

FOREIGN PATENT DOCUMENTS 0310113 4/1989 European Pat. Off. .

OTHER PUBLICATIONS

Prospectus of "Sumitomo Electric's Anti-Lock Related Products", no date.

*Primary Examiner*—Douglas C. Butler
*Attorney, Agent, or Firm*—Edwin E. Greigg; Ronald E. Greigg

[57] ABSTRACT

A hydraulic brake system for a vehicle including, brake pressure modulators that prevent the locking of vehicle wheels caused by excessively high braking pressures. Such brake pressure modulators include brake line blocking valves and cylinders with pistons, where upon piston displacement, pressure fluid escapes from the wheel brakes to lower the brake pressure. The displacements of the pistons are controlled via valve assemblies that are connected to a servo pressure source. Failure of the servo pressure source, if there is even a small leak of a valve assembly, can lead to at least partial loss of a brake force during a braking event. To recognize and indicate any leak that might be present, a control unit which acts upon the valve assemblies is arranged such that it directs the valve assemblies into various switching positions and in this process, via a pressure sensor, observes whether logically observed pressures are varying impermissibly.

16 Claims, 1 Drawing Sheet

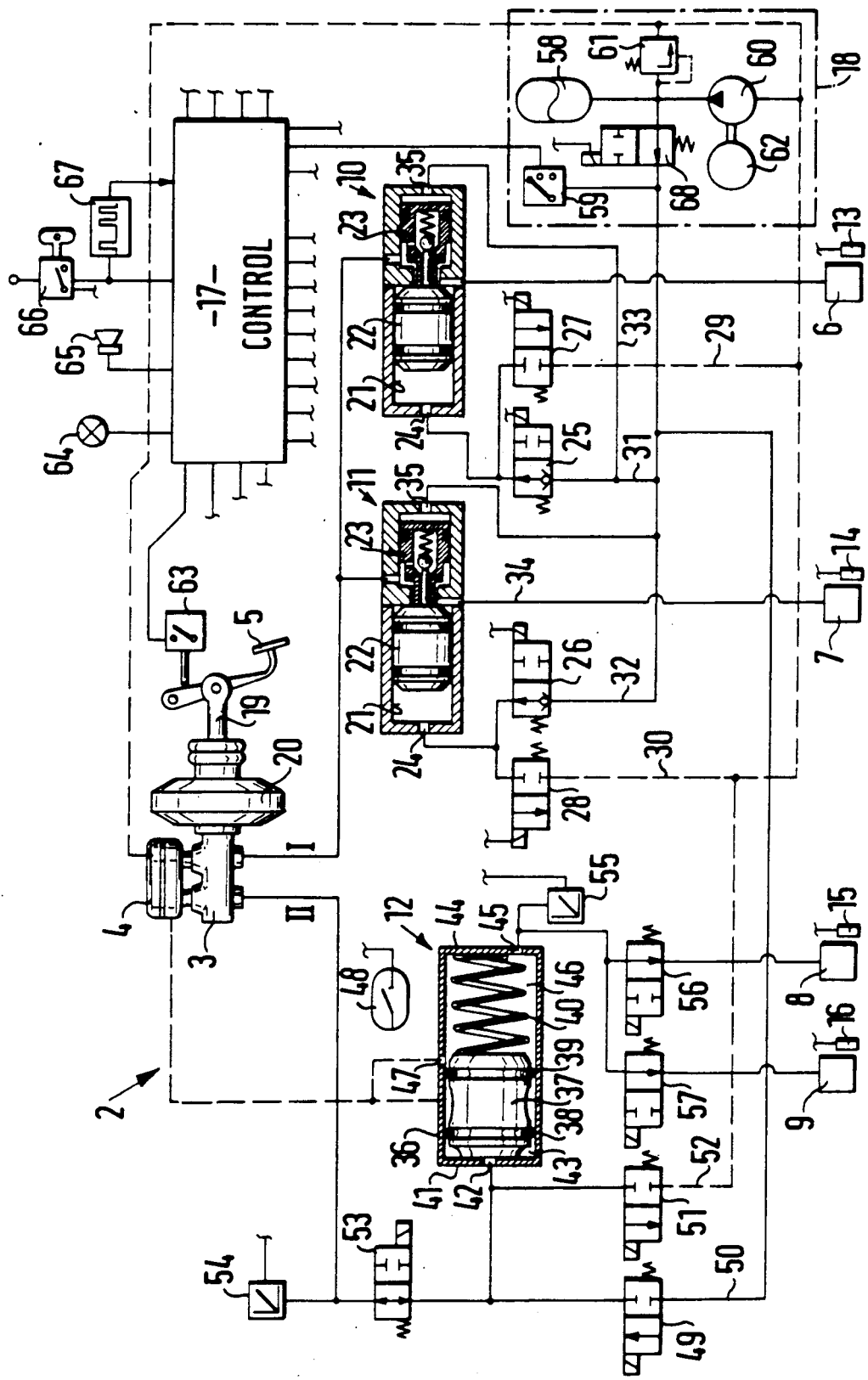

HYDRAULIC BRAKE SYSTEM FOR VEHICLES

BACKGROUND OF THE INVENTION

The invention is based on a hydraulic brake system for vehicles as defined hereinafter. A hydraulic brake system for vehicles, of this type and intended for preventing the vehicle wheels from locking, is described in a publication by Sumitomo Electric Industries Limited, Automotive Division, Japan. It cannot be precluded that the servo pressure source of such a vehicle brake system may suddenly fail, and that the valves that are intended to control the at least one brake pressure modulator may not close tightly, for instance because of contamination after an improperly performed servicing or by wearing of rubber seals from friction. In such a case, during braking the piston that is displaceable in the brake pressure modulator is no longer adequately supported by servo pressure fluid and can therefore yield to the brake pressure. This causes the brake pedal to sag downward, with the danger that the desired brake pressure and thus the desired deceleration of braking may no longer be brought about. If a plurality of brake pressure modulators are provided, then all of the pistons associated with them may disadvantageously yield, because if soil gets into the servo pressure source, it can spread to all of the valves.

OBJECT AND SUMMARY OF THE INVENTION

The vehicle brake system according to the invention has an advantage that the vehicle brake system checks itself automatically for tightness, and it includes means for warning the driver if a leak is ascertained that might be caused by soiled valves. The improvement of the invention entails little technological expense, particularly if the control unit that is needed anyway is configured as usual with a programmed computer. In that case, the commands that effect an automatic switchover of the valves and the associated observation of a pressure sensor need merely be stored in the program memory. Naturally the control unit is programmed such that normal braking and anti-skid operation that should become necessary take precedence over the automatic checking for tightness.

Features set forth herein describe an exemplary embodiment that is particularly economical, because a pressure sensor already needed for controlling the servo pressure source is also used as a measuring instrument for checking for tightness. Further provisions have an advantage that conventional pressure switches that respond to two or three threshold values can be used. The exemplary embodiment set forth has an advantage that even small pressure changes are recognizable by the control unit. Consequently the period of time for observation of any pressure changes that might occur can be kept quite short. A first check for tightness, which can be tripped when the ignition key of the vehicle equipped with this vehicle brake system is turned on, can therefore already be ended before the driver has completed the procedures that are unavoidably needed to set the vehicle into motion. The exemplary embodiment as defined has an advantage that a brake pressure sensor needed for the particular embodiment of the vehicle brake system, and which for brake pressure regulation reacts to very small pressure changes, can also be used for a check for tightness. Thus, with the exception of programming the computer, there are no additional costs associated with checking for tightness.

An additional advantage of this exemplary embodiment is that leaks that may possibly be present at an associated wheel brake or in a brake hose are also recognized by the control unit and reported to the driver. The further feature defined herein has an advantage that in the case of a leak in the wheel brake, the cylinder/piston assembly avoids evacuating the servo pressure source. Moreover, by selecting unequal diameters on the primary and secondary sides of the displaceable piston in the cylinder/piston assembly, an increase in brake pressure that is also advantageous for emergency braking operation, for instance, can be attained. The further feature as set forth has an advantage that in a check for tightness, any defect in at least one wheel brake disposed at the outlet side of the cylinder/piston arrangement can be recognized. This further increases the certainty with which defects in the vehicle brake system according to the invention can be detected and indicated. Certain characteristics of the invention has an advantage that even a leak that does not occur until the associated vehicle is in operation is still indicated.

Other features as defined herein has an advantage that checks for tightness can be performed in shortened periods of time. This is advantageous for instance upon startup of a vehicle equipped with this brake system.

The invention will be better understood and further objects and advantages thereof will become more apparent from the ensuing detailed description of a preferred embodiment taken in conjunction with the drawing.

BRIEF DESCRIPTION OF THE DRAWING

The sole figure of the drawing is a schematic illustration of an exemplary embodiment of the invention.

DESCRIPTION OF THE PREFERRED EMBODIMENT

The vehicle brake system 2 according to the invention has a master brake cylinder 3, preferably embodied for dual circuits, having a supply container 4, a brake pedal 5, wheel brakes 6, 7, 8, 9, brake pressure modulators 10, 11, 12, wheel rotation sensors 13, ;, 15, 16, a control unit 17 and a servo pressure source 18.

By means of the brake pedal 5, via a pedal rod 19, brake pressures can be generated in two work chambers, not shown, of the master brake cylinder 3 solely by means of foot power; these pressures reach two brake circuits I and II. To reinforce the foot power of the driver, a vacuum brake booster 20, known per se, may be associated with the master brake cylinder. Alternatively, a hydraulic brake booster could be provided, because a hydraulic servo pressure source 18 is already present anyway.

The brake circuit I includes two brake pressure modulators 10 and 11, which are located between the master brake cylinder 3 and the wheel brakes 6 and 7. The two front wheels of a vehicle, not shown, are for instance associated with the wheel brakes 6 and 7.

The brake circuit II ends at the wheel brakes 8 and 9, which then are assigned to the rear wheels of the vehicle. The brake pressure modulator 12 is located between these wheel brakes 8 and 9 and the master brake oylinder 3.

The brake pressure modulators 10 and 11 are identical in embodiment and each has a cylinder 21 with a piston 22 displaceable in it, and a brake line blocking valve 23 mounted on the cylinder 21. Opposite each brake line blocking valve 23, the cylinder 21 has a control connection 24. Each control connection 24 can be connected via its own first valve 25 and 26 to the servo pressure source 18. These two first valves 25 and 26 are preferably embodied as electromagnetically controllable check valves, such that when there is no current through them, servo pressure can flow through them from the servo pressure source 18 to the respective control connection, but with current, which can be supplied by the control unit 17, they close tightly against the pressure of the servo pressure source 18. One second valve 27 and 28 each is also connected to the respective control connection 24. These valves 27 and 28 are likewise controllable by the control unit 17. When they are without current, the second valves 27 and 28 assume their blocking positions. Return lines 29 and 30 begin at the second valves 27 and 28, respectively, and lead to the servo pressure source 18. From the servo pressure source 18, lines 31 and 32, respectively, lead to the first valves 25 and 26, and further lines 33 and 34 lead to the brake line blocking valves 23 of the two brake pressure modulators 10 and 11.

The brake line blocking valves 23 are embodied in a manner known per se such that they are opened whenever the associated pistons 22 are in their normal positions at the brake line blocking valves. The result is freely open communication between the master brake cylinder 3 and the wheel brakes 6 and 7. If the pistons 22 are displaced toward the respectively associated control connection 24, the brake line blocking valves 23 close. This disconnects the wheel brakes 6 and 7 from the master brake cylinder 3, so that a pressure that might be rising in the master brake cylinder 3 cannot cause any increase in pressure in these wheel brakes 6 and 7.

These brake line blocking valves 23 are also embodied such that they can be opened with pressure from the master brake cylinder 3 whenever the servo pressure 18 is not furnishing pressure and therefore no pressure is entering control connections 35 of the brake line blocking valves 23 via the lines 33 and 34. In that case the displacement force resulting from the brake pressure predominates and effects the aforementioned opening of the respective brake line blocking valve 23.

The two brake pressure modulators 10 and 11 serve to prevent the danger of wheel locking by lowering brake pressures in the wheel brakes 6 or 7.

The brake pressure modulator 12 is likewise intended to prevent the danger of wheel locking and is additionally suitable for operation as a so-called electrically controlled brake booster. In addition, this brake pressure modulator 12 is further suitable for limiting drive slip, i.e., for traction control, at drivable wheels, as long as these wheels are associated with the wheel brakes 8 and 9 in question.

The brake pressure modulator 12 has a cylinder 36 containing a piston 37, which is displaceable in it and carries two sealing rings 38, 39, and a restoring spring 40 that urges the piston 37 toward its outset position. A primary connection 42 is located at one end 41 of the cylinder 36, with which the piston 37 is in contact in its outset position. In the vicinity of the end 42, the cylinder 36 has a primary chamber 43 defined by the piston 37. On the opposite end 44 of the cylinder 36 are a secondary connection 45 and a secondary chamber 46. The cylinder 36 also has a refill connection 47, in the vicinity of its circumference, which communicates with the supply container 4. Associated with the brake pressure modulator 12 is a travel sensor 48, by means of which displacements of the piston 37 are indicated to the control unit 17. A first valve 49 communicates in turn with the primary connection 42 and is supplied with pressure from the servo pressure source 18 via a line 50. This first valve 49 is also electrically controllable; it is closed when it is without current. A second valve 51 is electrically controllable, as well. When it is without current, it is likewise closed. It communicates at one end with the primary connection 42; at the other, via a return line 52, the second valve 51 is connected to the pressureless supply container 4 and the servo pressure source 18. The primary connection 42 is connected to the brake circuit II and thereby to the master brake cylinder 3, via another electromagnetically controllable valve 53, which is normally open and can be electrically controlled into its blocking position.

The brake pressure modulator 12 further includes a first brake pressure sensor 54 and a second brake pressure sensor 55. The first brake pressure sensor 54 is permanently connected to the master brake cylinder 3 and is used as a set-point transducer. The second brake pressure sensor 55 is permanently connected to the secondary connection 45 and forms an actual-value transducer. Both brake pressure sensors 54 and 55 are connected to the control unit 17, which with respect to the brake pressure modulator 12 forms a regulator, to regulate brake pressures at the secondary connection 45 as a function of brake pressures that are fed into the master brake cylinder 3 by means of the brake pedal 5.

A separate wheel brake selector valve 56 and 57 can be disposed between the secondary connection 45 and each of the wheel brakes 8 and 9, respectively. The brake selector valves 56 and 57 can be closed electrically for preventing brake fluid under pressure to be applied to one or both brakes 8, 9.

The effect of closing is that pressure changes taking place in the secondary chamber 46 of the brake pressure modulator 12 are not propagated into any wheel brake the wheel brake selector valve of which is electrically closed.

The servo pressure source 18 has a pressure reservoir 58, a pressure sensor 59, a pump 60, a safety valve 61, and a drive motor 62 for the pump 60. The pressure sensor 59 is for instance embodied as a pressure switch that responds to three pressure thresholds, and it serves to indicate to the control unit 17 a minimum pressure below which the control unit must switch on the drive motor 62 of the pump 60. The pressure sensor 59 also indicates to the control unit 17 when the pressure reservoir 58 is filled full enough that further operation of the pump 60 is unnecessary. This switching threshold is located below a pressure at which the safety valve 61 opens and thus protects the pump 60 and pressure reservoir 58 from overload. During operation, the pump 60 supplies itself with pressure fluid from the supply container 4.

Function of the Vehicle Brake System:

By actuation of the brake pedal 5, a switch 63, which may be a brake light switch and is connected to the control unit 17, is actuated, and the vacuum brake booster 20 is activated via the pedal rod 19, so that brake pressure is produced in the master brake cylinder 3 that reaches the brake circuits I and II. If the vehicle to be braked is on a road surface having a high coefficient of friction, so that the brake pedal is actuated only weakly to moderately, then brake pressures generated in the master brake cylinder 3 are not high enough to cause a danger of locking for the wheels (not shown) coupled to the wheel brakes 6, 7, 8, 9.

With increasingly more forceful actuation, or if the vehicle moves from a roadway portion with a high coefficient of friction to one with a low coefficient of friction, then the brake pressure may be high enough to brake the vehicle wheels so strongly that excessively high braking slippage or the danger of wheel locking arises. As a consequence, the wheel rotation sensors 13 or 14, 15 and/or 16 supply wheel rotation signals to the control unit 17 at characteristically longer and longer time intervals. Inside the control unit 17, the time intervals of the wheel rotation signals are logically evaluated; and in accordance with the logical results of evaluation, the control unit 17 generates electrical control signals for the valve. If it is for instance recognized via the wheel rotation sensor 13 that a vehicle wheel coupled to the wheel brake 6 is threatening to lock, then the control unit 17 closes the first valve 25 counter to the pressure of the servo pressure source 18 and opens the second valve 27. The control connection 24 of the brake pressure modulator 10 is consequently disconnected from the servo pressure source 18 and connected to the return line 29. This causes pressure fluid to flow out of the cylinder 21 and causes the piston 22 to move toward the control connection 24. As a result, pressure supplied through the control connection 35 to the brake line blocking valve 23 is capable of closing this brake line blocking valve 23, so that the wheel brake 6 is hydraulically disconnected from the master brake cylinder 3. Upon further displacement of the piston 22 toward the control connection 24, which is dictated by the initially excessively high brake pressure in the wheel brake 6 and the comparably lower pressure in the control connection 24, the brake pressure in the wheel brake 6 drops, and the wheel brake 6 brakes the associated wheel to a lesser extent, so that by contact with the road surface it undergoes an increase of rotation. As a result the wheel rotation signals are reported to the control unit 17 at increasingly shorter time intervals by the wheel rotation sensor which are likewise logically evaluated. If the evaluation shows that a danger of locking has now been overcome, then the control unit 17 can cause the second valve 27 to return to the blocking position and can accordingly keep a pressure prevailing at the control connection 24 constant, with the result that the brake pressure prevailing in the wheel brake 6 is likewise maintained, via the displaceable piston 22. If the rotational speed of the wheel increases further, such that the control unit 17 recognizes the option of a brake pressure increase as allowable, then it renders the first valve 25 currentless, so that the piston 22 is displaced toward the brake line blocking valve 23 by means of pressure from the servo pressure source 18, and the pressure in the wheel brake 6 is thereby increased. Depending on prevailing conditions, it is accordingly possible for communication between the wheel brake 6 and the master brake cylinder 3 to be re-established, via the brake line blocking valve.

Since the brake pressure modulator 11, as already noted, is embodied identically to the brake pressure modulator 10, its operation with respect to the wheel brake 7 needs no further description.

As already mentioned, the brake pressure modulator 12 also serves to perform boosting during normal operation. A soon as the brake pedal 5 is depressed to initiate normal braking, the switch 63 reports to the control unit 17 that boosting should be performed. To perform boosting, the control unit 17 directs the valve 53 to its blocking position. Consequently, upon further actuation of the brake pedal 5, a brake pressure generated in the master brake cylinder 3 leads to a pressure rise in the first brake pressure sensor 54, through the brake circuit II. The brake pressure sensor 54 reports the pressure level to the control unit 17, while the second brake pressure sensor 55, which communicates with the wheel brakes 8 and 9 via the initially open wheel brake selector valve 56 and 57, reports the brake pressure prevailing there, which is initially at zero, to the control unit 17. The control unit 17 is arranged to recognize differences in pressure increase between the brake pressure sensors 54 and 55. In principle, it does not matter whether the signals associated with the sensed pressures are reported to the control unit 17 in the form of proportional analog signals, or in the form of digital signals with sufficiently small gradations between them. The control unit 17, suitably adapted for analog or digital signals, compares the signals of the two pressure sensors 54 and 55, optionally taking into account an arbitrary and possibly variable boosting factor for the signals of either the brake pressure sensor 54 or the brake pressure sensor 55, and if the signals are unequal generates control signals. The control signals are generated such that with the aid of the valves 49 and 51, a signal originating in the second brake pressure sensor is made to conform to the set-point signal indicated by the first brake pressure sensor 54; this set-point signal can be set arbitrarily by the driver via the brake pedal 5. If the set-point value is higher than the actual value, then the control unit 17 controls the valve 49 so that the pressure source 18, by means of its pressure, forces pressure fluid into the primary chamber 43 and as a result displaces the piston 37, initially counter to the force of the restoring spring 40. Because of the limited capacity of the wheel brakes 8 and 9, a brake pressure arises in them and in the secondary chamber 46 that is detected by the second brake pressure sensor 55 and reported to the control unit 17. The control unit 17 causes the valve 49 to return to its closing position whenever the rising brake pressure or the magnitude of the associated actual signal, optionally taking into account an arbitrary and possibly variable boosting factor, has attained the level of the set-point signal from the brake pressure sensor 54. If the driver now wishes to lower the brake pressure, he can accomplish this by letting up on the brake pedal 5. As a result, the pressure in the master brake cylinder 3 drops; it accordingly drops in the first brake pressure sensor 54 as well. Consequently, the brake pressure in the wheel brakes 8 and 9 is initially above the pressure that the driver has preselected. Via the second brake pressure sensor 55, the control unit 17 recognizes that the pressure in the wheel brakes 8 and 9 is too high. The control unit 17 therefore opens the valve 51, so that pressure fluid can escape from the prmary chamber 43 toward the servo pressure source 18 and supply container 4. As a result, the piston yields to the pressure present in the wheel brakes 8 and 9 and in the secondary chamber 46, in favor of its outset position, with the result that the pressures in the wheel brakes 8 and 9 drop. The control unit 17 keeps the valve 5 open until such time as the control unit 17, via increasingly shorter indication signals of the second brake pressure sensor 55, recognizes that the pressure desired by the driver has now been established. If the driver releases the brake pedal 5 completely, then the control unit 17 opens the valve 51, until the piston 37 is in its outset position. If the second brake pressure sensor 55 is functioning without error and accurately, then it would report the value of zero to the control unit 17. On the other hand, by means of the travel sensor 48, the control unit 17 can also ascertain that the piston 37 has moved past the refill connection 47, and accordingly that the secondary chamber 46 and consequently the wheel brakes 8 and 9 as well have been fully pressure-relieved. Subsequently the control unit 17 closes the valve 51 and opens the valve 53.

If in the next ensuing braking, the control unit 17 for instance recognizes from indications of the pressure sensor 59 that the servo pressure source 18 has failed, then the control unit 17 does not send a control command to the valve 53. This valve consequently remains open, and brake pressure generated in the master brake cylinder 3 reaches the primary chamber 43 through the brake circuit II, and by displacement of the piston 37 generates brake pressure in the secondary chamber 46 and finally in the wheel brakes 8 and 9. It is accordingly apparent that despite the failure of the servo pressure source 18, braking of the vehicle equipped in this way is possible. In this situation, as already noted at the outset, the piston 37 can be given a larger diameter on its primary side than on its secondary side.

In a panic actuation of the brake pedal 5, if the vehicle should for example move from a road surface with very good traction to an icy surface, then the wheels coupled to the wheel brakes 8 and 9 will be overbraked; this is recognized by the control unit 17 in the manner already described via the wheel rotation sensors 15 and 16 and leads to the generation of control signals. It is assumed that at the instant the danger of locking arises, the valves 49, 51 and 53 are in their closed positions; then the control unit 17 will open the valve 51, causing the pressure in the primary chamber 43 to drop and correspondingly causing the brake pressure in the wheel brakes 8 and 9 to drop. If no further reduction in brake pressure is necessary, the valve 51 is directed into its closing position. If the rotational behavior of the wheels permits an increase in brake pressure, then the control unit 17 will open the valve 49 to increase the brake pressure. If the control unit 17 is intact, and if the servo pressure source 18 is reported to be intact, the programmed ABS logic of the control unit 17, supplied by signals from the wheel rotation sensors 15 and 16, will dominate over the wishes of the driver.

In the event that only the wheel rotation sensor 15, for example, furnishes the control unit 17 with signal trains typical of a danger of wheel locking, while the control unit 17 is contrarily unable to infer a danger of locking for the wheel coupled to the wheel brake 9, then the wheel brake selector valve 57 will be closed. After that, the wheel brake modulation already described can be initiated by the control unit 17 and performed. The same is true if there is a danger of locking at the wheel associated with the wheel brake 9, intead of that of the wheel brake 8. Accordingly, by means of a single brake pressure modulator 12 and by providing the two wheel brake selector valves 56 and 57, it is possible to set brake pressures at different levels in two wheel brakes 8 and 9, if necessary.

This option of setting different pressures in the wheel brakes 8 and 9 can also be utilized for traction control, if the wheels associated with the wheel brakes 8 and 9 are driven wheels. Drive slip that increases excessively can in fact be recognized by the control unit 17 because of its programming, from wheel rotation signals from the wheel rotation sensors 15 and 15, if these signals vary characteristically from signal trains from the wheel rotation signals 13 and 14 of undriven wheels, and if the switch 63 reports that the brake pedal 5 is in its outset position. Then the control unit 17 closes the valve 53 and opens the valve 49, putting the primary chamber 43 under pressure and displacing the piston 37 to generate brake pressure. Depending on whether one or both of the driven wheels are tending to spin, this brake pressure can be delivered to one or the other of the two wheel brakes 8, 9 by leaving one or the other of the two wheel brake selector valves 56 and 57 open. A terminatio of a brake process initiated to limit drive slip is performed by closure of the valve 49 and opening of the valve 51. Once the piston 37 returns to its outset position, the control unit 17 can cause the valve 53 to return to its outset position, so that the brake pressure modulator 12 is prepared to generate brake pressures in the wheel from the master brake cylinder 3, if necessary.

As mentioned in conjunction with the description of the function of the brake pressure modulator 12, the control unit 17 recognizes any situation in which the servo pressure source 18 is furnishing insufficient servo pressure, or none at all. Triggering of the valves 25, 26, 27, 28, 49, 51, 53, 56 and 57 is then suppressed, even if the danger of wheel locking or excessively increasing drive slip is recognized from wheel rotation signals.

To inform the driver as to the state of the valves 25, 26, 27 and 28, which are relevant to safety, the control unit 17 is arranged to performing checking procedures automatically. These checking procedures can be performed as long as the switch 63 is not actuated by moving the brake pedal 5. To check the tightness of the valve 25 and 26 in particular, the control unit 17 will direct these valves 25 and 26 electrically into their closing positions, or depending on the internal structure of the valves 25 and 26 will electrically prevent them from opening as a consequence of pressure differences. These pressure differences can be generated by opening the valves 27 and 28 when the pressure reservoir 58 is filled to a variably great extent. During the indicated switching positions of the valves 25–28, the control unit 17 observes whether a change in the indication of the pressure sensor 59 has occurred as a function of pressure. If the pressure sensor 59 does not signal any pressure change during a predetermined period of observation, then both valves 25 and 26 are tight. If a pressure change is signaled in the control unit 17, however, then it is possible that one of the valves 25 or 26 might be leaking. The control unit 17 then switches on a warning light 64 and/or an acoustical alarm 65.

Instead of a pressure sensor 59 that responds to only a few pressure thresholds, an analog indication pressure sensor of the generla type of the brake pressure sensors 54, 55 can be installed. If the control unit 17 is already arranged to recognize small pressure differences, because of the mode of operation of the brake pressure modulator 12, then it is possible by using an analog indication pressure sensor 59 to recognize pressure changes in the servo pressure source 18 that occur slowly, even with relatively short observation periods. As a result, check cycles that proceed automatically can take place rapidly. A further option for fast checking is to provide that in addition to the described triggering of the valves 25, 26, 27 and 28, the valve 53 is closed and the valve 49 is opened. The valve 51 remains closed in this process. As a result, the pressure of the servo pressure source 18 acts via the brake pressure modulator 12 upon the second brake pressure sensor 55, which as already described is already suitable for indicating small pressure changes. As a result, when the brake pressure modulator 12 is installed, an already conventional, economical pressure sensor 59 can still be used inside the servo pressure source 18.

If a displacement of the piston 37, reported via the travel sensor 48, is also taken into account by the control unit 17 during the above-described kind of tightness testing using the brake pressure sensor 55, it is also possible to recognize whether a displacement of a piston that is an indication of leakage at the seal 39 or at the wheel brakes 8 and 9 is occurring. It is also possible in that case, because of the pressure fluid receiving characteristic of the wheel brakes 8 and 9, by suitable triggering of the wheel brake selector valves 56 and 57, to check each wheel brake 8 and 9 individually for tightness and for whether it needs to be bled. Because of the disposition of the second brake pressure sensor 55, it is naturally also possible, by logical triggering of the valves 49, 51 and 53, to recognize via the second brake pressure sensor 55 whether the valves in question are leaking. Any illogically rising pressure is an indication of leakage of the valve 49, while an illogically dropping pressure points to leakage of one of the valves 51 and 53, or of the seal 38.

It will be appreciated from the above description that for automatically checking the components of the vehicle brake system that are involved in safety, all that may be necessary is to program the control unit 17 to perform the control of checking steps. This is because pressure sensors that are already present can be used, and control units are already provided with at least one warning device that signals failure of the control unit. Accordingly, the only additional expense is to increase the memory that stores the commands necessary for performing the checking program.

As already noted, the checks described are tripped when the vehicle equipped with this vehicle brake system is started. This can be done by switching on the control unit 17 via an ignition switch 66 that is already present. Advantageously, further checks are tripped during vehicle operation at times when the brake pedal 5 and its switch 63 are not actuated. To this end, the ignition switch 66 can for instance switch on a pulse transducer 67, that supplies tripping pulses to the control unit 17 at time intervals. Alternatively, such tripping pulses can be generated by the control unit 17 in accordance with the programming of its computer, by repeated downward counting of clock pulses that are emitted by a clock generator that is part of the computer. Naturally, the control unit 17 is arranged such that it will discontinue the checks as soon as the switch 63 is actuated by means of the brake pedal 5.

The checking procedure can be speeded up, in accordance with a further concept of the invention, by means of a 2/2-way valve 68 connected following the pressure reservoir 58; in its normal position this valve is closed, and as a result it carries the pressure stored in the pressure reservoir 58 to the pressure sensor 59 and to the valves to be checked. During the typical time periods for observing pressure for checking tightness, the 2/2-way valve 68 can be closed, so that the pressure reservoir 58 will not be evacuated to bring about a pressure loss that would be typical of leakage. Consequently, any pressure losses that might occur take place faster and can be recognized within shorter pressure observation periods. The control of the 2/2-way valve 68 is likewise attainable by programming of the control unit 17. Monitoring of this 2/2-way valve for tightness is performed automatically, using a pressure sensor 59 or 55 and at least one of the valves 25, 27, 49, 51, 53; otherwise, there is the danger that during the brief pressure observation periods, the pressure reservoir 58 might, without its being noticed, replace the quantities of pressure fluid the outflow of which should have caused pressure changes recognizable by the pressure sensor 59 or 55. This kind of speedup of checking can be performed regardless of how the pressure sensor 59, for instance, is embodied, or how many brake pressure modulators, for instance of the type of the brake pressure modulator 10 and/12, are used.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic brake system for a vehicle including wheels and wheel brakes, which comprises:

a master brake cylinder, wheel brakes (6, 7, 8, 9), a brake line extending between each of said wheel brakes and the master brake cylinder, brake pressure modulators (10, 11, 12), a brake line blocking valve (23) connected to said brake pressure modulators (10, 11), each of said brake pressure modulators include a cylinder, connected to at least one of each of said wheel brakes, said cylinder includes a displaceable piston subjected to the pressure of the at least one wheel brake connected thereto and a control connection (24, 35, 42, 45), a servo pressure source (18) which is supplied fluid from a pressureless supply container (58), a pair of electrically closable valves (25, 26) disposed between the servo pressure source and the control connection (24) of each of said brake pressure modulators (10, 11), a second pair of electrically openable valves (27, 28) disposed between the control connection (24) and the supply container, a control unit (17) that controls each of said first and second pairs of electrically openable valves, said control unit is arranged for electrical control of each of said first and second pairs of electrically openable valves as a function of a rotation of at least one vehicle wheel coupled to the wheel brake (67), at least one electrically controllable valve assembly (49, 52, 53) disposed between the master brake cylinder and at least one wheel brake (8, 9) and the servo pressure source (18), for incidental supply of pressure fluid to the wheel brake (8, 9) from the master brake cylinder (3) and for supply of pressure fluid from the servo pressure source (18) to the wheel brake (8, 9) in normal operation; a first brake pressure sensor (54) which is connected to the master brake cylinder (3) and which forms a set-point transducer, a second brake pressure sensor (55), which is associated with at least one wheel brake (8, 9) that forms an actual-value transducer, and a third pressure sensor (59) which senses failure of said servo pressure source (18), said control unit (17) is connected to each of said pressure sensors (54, 55, 59) and forms a regulator which acts upon said first and second pairs of first and second valves (24, 25, 26, 27) and the valve assembly (49, 51, 53), for regulating brake rpessures into the wheel brakes (6, 7, 8, 9) as a function of the pressure in the master brake cylinder (3), and is arranged for performing checking cycles for checking fluid leakage outside of periods of time in which a brake pedal (5) is actuated, by temporarily switching over each of said pairs of said first and second pairs of electrically openable control valves and said valve assemblies (25, 26, 27, 28, 49, 43, 57, 56) to determine whether said servo pressure source (18) is intact, and as to whether pressures logically arising in accordance with switchover of said valves vary during an observation period, in a typical manner that is an indication of a leak, and for outputting an error signal whenever a pressure change typical of a leak takes place.

2. A vehicle brake system as defined by claim 1, in which said pressure sensor (59) is permanently connected to the pressure reservoir (58) and forms a control switch which responds to a plurality of pressure thresholds, for a pump (60) which charges the pressure reservoir (58).

3. A vehicle brake system as defined by claim 2, in which said control unit (17) is arranged for performing checking cycles at the onset of operation and during the operation of a vehicle equipped with the vehicle brake system.

4. A vehicle brake system as defined by claim 2, which includes an electrically controllable 2/2-way valve (68) disposed following the pressure reservoir (58), said 2/2-way valve is open in its normal position and in a manner controllable by the control unit (17) disconnects the pressure sensors (59, 55) and the pairs of first and second electrically closable valves (25, 26, 27, 28, 49, 53, 57, 56) to be checked from the pressure reservoir (58) during at least one pressure observation period; and that the control unit (17) is additionally programmed for checking the 2/2-way valve (68) for leakage by means of the pressure sensor (59, 55) and at least one of the valves (25, 27, 49, 53).

5. A vehicle brake system as defined by claim 1, in which the pressure sensor (59) is permanently conenncted to the pressure reservoir (58) and includes an analog transducer, via which a pump (60) is controllable, by means of said control unit (17), for charging the pressure reservoir (58).

6. A vehicle brake system as defined by claim 5, in which said control unit (17) is arranged for performing checking cycles at the onset of operation and during the operation of a vehicle equipped with the vehicle brake system.

7. A vehicle brake system as defined by claim 5, which includes an electrically controllable 2/2-way valve (68) disposed following the pressure reservoir (58), said 2/2-way valve is open in its normal position and in a manner controllable by the control unit (17) disconnects the pressure sensor (59, 55) and the valves to be checked (25, 256, 27, 28, 49, 53, 57, 56) from the pressure reservoir (58) during at least one pressure observation period; and that the control unit (17) is additionally programmed for checking the 2/2-way valve (68) for leakage by means of the pressure sensor (59, 55) and at least one of the vales (25, 27, 49, 53).

8. A vehicle brake system as defined by claim 1, in which said brake pressure modulator (12) is installed between the valve assembly (49, 51, 53) and the at least one wheel brake (8, 9), said brake pressure modulator has a cylinder (36) with a displaceable piston (37) separating a primary chamber (43) from a second chamber (46) which includes a restoring spring (40) that urges the piston (37) toward the primary chamber (43); said primary chamber (43) is connected to the valve assembly (49, 52, 53) in order to receive pressure from the master brake cylinder (3) or from the sevo pressure source (18); the secondary chamber (46) communicates with the wheel brake (8, 9) and the second brake pressure sensor (55) in order to provide an output brake pressure; and that in checking leakage, the primary chamber (43) can be made to communicate via the valve assembly (49) with the pressure reservoir (58) to observe the pressure of the pressure reservoie (58).

9. A vehicle brake system as defined by claim 8, in which a travel sensor (48) associated with the piston (37) is connected to the control unit (17), to indicate a displacement of the piston (37) during a pressure observation period.

10. A vehicle brake system as defined by claim 9, in which said cotnrol unit (17) is arranged for performing checking cycles at the onset of operation and during the operation of a vehicle equipped with the vehicle brake system.

11. A vehicle brake system as defined by claim 9, which includes an electrically controllable 2/2-way valve (68) disposed following the pressure reservoir (58), said 2/2-way valve is open in its normal position and in a manner controllable by the control unit (17) disconnects the pressure sensor (59, 55) and the valves to be checked (25, 26, 27, 28, 49, 53, 57, 56) from the pressure reservoir (58) during at least one pressure observation period; and that the cotnrol unit (17) is additionally programmed for checking the 2/2-way valve (68) by leakage by means of the pressure sensor (59, 55) and at least one of the valves (25, 27, 49, 53).

12. A vehicle brake system as defined by claim 8, in which said cotnrol unit (17) is arranged for performing checking cycles at the onset of operation and during the operation of a vehicle equipped with the vehicle brake system.

13. A vehicle brake system as defined by claim 8, which includes an electrically controllable 2/2-way valve (68) disposed following the pressure reservoir (58), said 2/2-way valve is open in its normal position and in a manner controllable by the cotnrol unit (17) disconnects the pressure sensor (59, 55) and the valves to be checked (25, 26, 27, 28, 49, 53, 57, 56) from the pressure reservoir (58) during at least one pressure observation period; and that the control unit (17) is additionally programmed for checking the 2/2-way valve (68) for leakage by means of the pressure sensor 959, 55) and at least one of the valves (25, 27, 49, 53).

14. A vehicle brake system as defined by claim 1, in which said control unit (17) is arranged for performing checking cycles at the onset of operation and during the operation of a vehicle equipped with the vehicle brake system.

15. A vehicle brake system as defined by claim 14, which includes an electrically controllable 2/2-way valve (68) disposed following the pressure reservoir (58), said 2/2-way valve is open in its normal position and in a manner controllable by the control unit (17) disconnects the pressure sensors (59, 55) and the pairs of first and second electrically closable valves (25, 26, 27, 28, 49, 53, 57, 56) to be checked from the pressure reservoir (58) during at least one pressure observation period; and that the cotnrol unit (17) is additionally programmed for checking the 2/2-way valve (68) for leakage by means of the pressure sensor (59, 55) and at least one of the valves (25, 27, 49, 53).

16. A vehicle brake system as defined by claim 1, which includes an electrically controllable 2/2-way valve (68) disposed following the pressure reservoir (58), said 2/2-way valve is open in its normal position and in a manner controllable by the control unit (17) disconnects the pressure sensor (59, 55) and the valves to be checked (25, 26, 27, 28, 49, 53, 57, 56) from the pressure reservoir (58) during at least one pressure observation period; and that the control unit (17) is additionally programmed for checking the 2/2-way valve (68) for leakage by means of the pressure sensor (59, 55) and at least one of the valves (25, 27, 49, 53).

* * * * *